Nov. 3, 1931.  A. M. JOSEPHO  1,830,168
PHOTOGRAPHIC CAMERA
Filed Feb. 18, 1928   7 Sheets-Sheet 1

Nov. 3, 1931.  A. M. JOSEPHO  1,830,168
PHOTOGRAPHIC CAMERA
Filed Feb. 18, 1928   7 Sheets-Sheet 3

Nov. 3, 1931.     A. M. JOSEPHO     1,830,168
PHOTOGRAPHIC CAMERA
Filed Feb. 18, 1928     7 Sheets-Sheet 5

Inventor
Anatol M. Josepho
By his Attorney
M. Lee Helms

Nov. 3, 1931.  A. M. JOSEPHO  1,830,168
PHOTOGRAPHIC CAMERA
Filed Feb. 18, 1928    7 Sheets-Sheet 6

Patented Nov. 3, 1931

1,830,168

UNITED STATES PATENT OFFICE

ANATOL M. JOSEPHO, OF NEW YORK, N. Y., ASSIGNOR TO MULTIPOSE PORTABLE CAMERAS, LIMITED, OF LONDON, ENGLAND

PHOTOGRAPHIC CAMERA

Application filed February 18, 1928. Serial No. 255,444.

The object of the present invention is to provide a camera particularly adapted to act upon a relatively long sensitized strip in such manner that the strip is given successive feeding movement across the path of the lens, that portion of the strip in front of the lens remaining at rest during exposure whilst a forward section of the same strip is being wound in upon a take-up spool. The camera is thrown into action by a handle attached to a rotatable shaft and the strip feeding, shutter operating, counter-actuation, and finally the automatic stop device are all actuated either directly or indirectly from said rotatable shaft. A further object of the invention is to provide a novel form of finder, which is multiple in construction; a further object of the invention is to provide a novel form of means, including the film retorts, for permitting easy positioning of the sensitized strip; a further object is to provide a novel form of locking means for the actuating shaft operable when the strip is withdrawn from the initial holding rotor and the exposures are completed, such locking mechanism being adapted to act upon the feed rolls so as to lock them in that position in which they will offer no resistance to the removal of the exposed strip or insertion of a fresh strip; a further object of the invention is to provide a novel form of counter; a further object is to provide a novel form of gate or guiding rail for the sensitized strip. Further objects will be hereinafter described.

The camera casing comprises a front wall 1, a rear wall 2, a bottom wall 3, a top wall 4, a side wall 5 and an upper cover plate 6 and a lower cover plate 7. The lens holder is indicated at 8 and the shutter rod at 9.

Supported on suitable bosses provided by side wall 5 is a shaft 10 which carries an operating handle exterior wall 5, the handle being indicated at 11. Through operative connections with shaft 10 the various elements of the camera, requiring actuation, are given their operative movements. These elements will now be described.

*The sensitized strip holding means*

Figure 12:
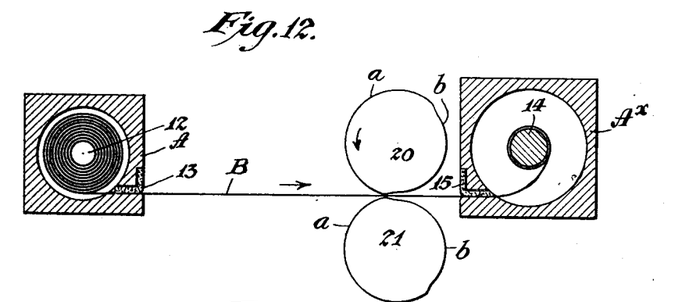
Figures 12, 13 and 14 are diagrams showing successive operations of the film feeding mechanism.

A novel form of holding means for the sensitized strip, both before and after exposure, is provided. The major body of the sensitized strip is reeled upon a spool 12 carried within a retort A which is provided with an egress slot light-protected by felt 13 or the like. The strip itself is indicated at B and an end thereof is projected within the take-up retort A$^x$ and secured to spool 14. The slot of the take-up retort is protected by felt or the like as indicated at 15. It is intended that the two retorts be sold together as a unit and prior to using they are moved apart as shown in Figure 12, thus providing a strip between them which may be placed intermediate the feed rolls and in a strip guide. The guide consists of a fixed guide plate 16 secured to the casing by the screws 17, opposite which is a guide plate 18 having a cut-away portion at 19 for the passage of the image, both plates having cut-away portions to receive the feed rolls, the latter being indicated at 20, 21. Opposite the image aperture 19, guide plate 18 is provided with a hinged section 18$^x$, the hinge being indicated at 22, Figure 8. The hinge is provided with a right angle extension 22$^x$ engaged by a spring 23, the spring having a tendency to throw the hinged section in a direction away from guide plate 16, or in other words to "open" position. The hinge is connected to a short rod 24 which is engaged by cover plate 7 in such manner that when the latter is in position as illustrated in Figures 9 and 11, the hinged section is closed and when the cover plate 7 is removed to enable access to the strip and strip retorts, spring 23 acts upon hinge 22 to "open" the hinged section 18$^x$ as is indicated in Figure 10.

Figure 3:
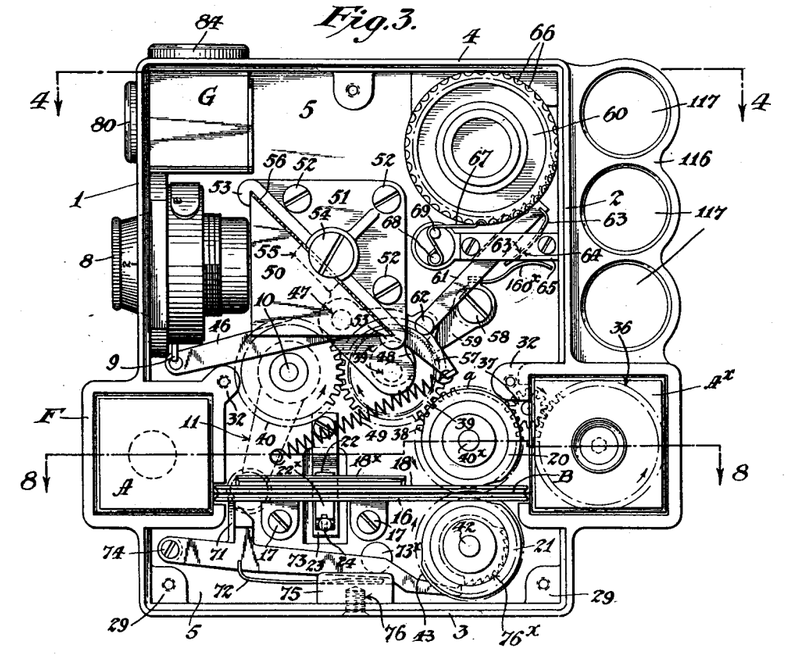
Figure 3 is a side elevation with covers removed.

When cover plate 7 is removed, the supply retort A and the take-up retort A$^x$ with the sensitized strip between them in the position shown in Figure 3 may be moved downward into the camera. In such movement the intermediate section of the strip passes between guide plates 16 and 18 and below the image opening 19 the edge of the strip, even if it be slightly wavy or otherwise distorted from a straight edge, will not be obstructed by the guide plate 18, adequate reception recess being provided by the opening of section 18$^x$. Then, when the cover plate 7 is again placed in position, rod 24 will be depressed to move guide plate section 18$^x$ into close contact with the strip, without actually imparting a resistance-pressure thereto.

Figure 1:
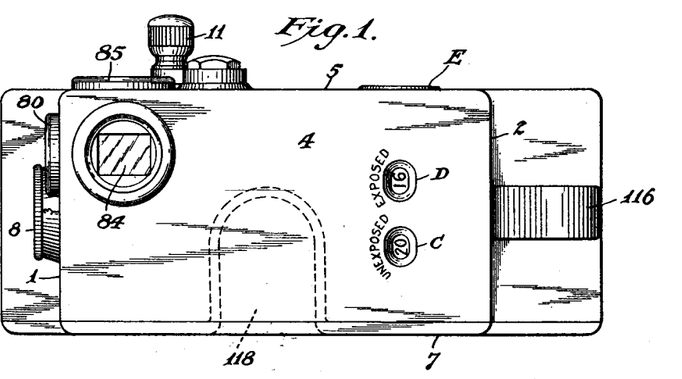
Figure 1 is a plan view of the camera.
Figure 2:
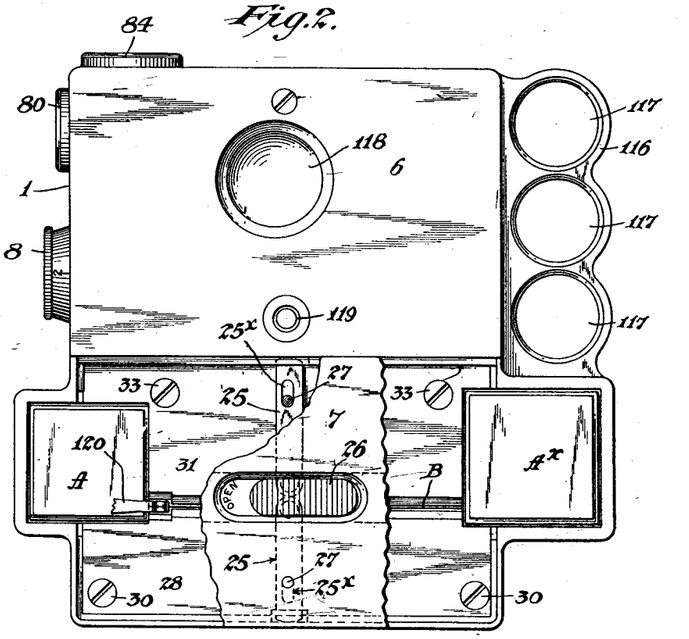
Figure 2 is a side elevation broken away to show convenient application of film retorts.

The cover plate is provided with two locking lugs 25, one end of each lug being pivotally secured to a sliding thumb-piece 26 on plate 7 exterior thereto and each lug intermediate its length, but nearer the outer end, having a slot 25$^x$ entered by guide and holding pin 27 carried by said cover plate 7. When the thumb-piece 26 is moved to the left from its position shown in Figure 2, the lugs are drawn endwise and their outermost or locking ends are withdrawn from shoulders provided by the casing, the cover thus being rendered removable. A reverse sliding movement of thumb-piece 26, when the cover is again in position, locks the cover to the casing. It will be noted that the thumb-piece is placed within a depression of the cover plate 7 so that it will lie flush therewith. Within the depression at the left may be embossed the word "Open", and at the right the word "Closed". At the side of guide plate 16 is a supplementary cover plate 28 screwed to casing lugs 29 by screws 30 and at the side of guide plate 18 is a supplementary cover plate 31 secured to casing lugs 32 by screws 33. These supplemental plates need not be disturbed in the insertion or removal of retorts A, A$^x$ with sensitized strip B.

Figure 8:
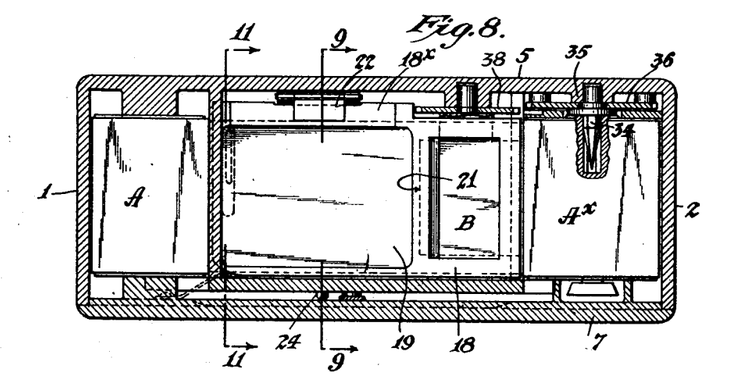
Figure 8 is a horizontal section on the line 8—8, Figure 3, showing the picture field.
Figures 9, 10, 11:
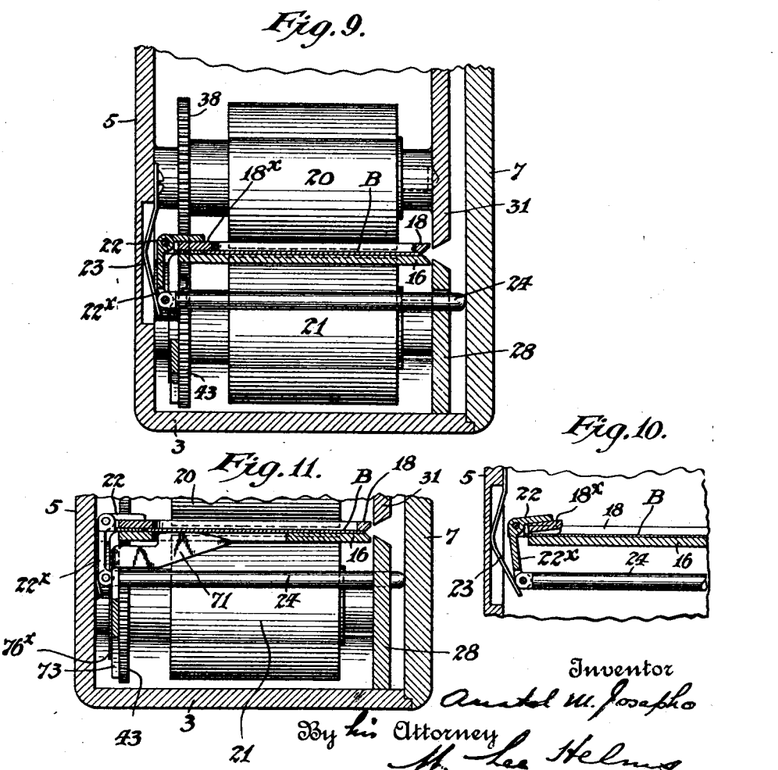
Figure 9 is a cross section on the line 9—9, Figure 8.
Figure 10 is a detail section showing a portion of the mechanism of Figure 9 in another position.
Figure 11 is a cross section on the line 11—11 of Figure 8, showing film control of locking mechanism.

As will be seen in Figure 8, the base of retort A$^x$ is provided with an axial aperture concentric with an aperture in the take-up spool 14, the latter aperture having squared sides, hexagonal for example, to correspond with the angular surfaced driving stud shaft 34.

*The strip driving means*

Stud shaft 34 is journalled in a boss 35 projecting inwardly from the casing wall, and it carries a gear wheel 36 in mesh with a pinion 37 driven by a gear wheel 38. Gear wheel 38 in turn meshes with a gear wheel 39 driven by a main driving gear 40 (see Fig. 5). Gear 40 is carried by drive shaft 10 driven through the rotation of handle 11. Gear wheels 38, 39 and 40 may be of equal diameter as shown in the drawings, or the ratio may be as desired. Pinion 37 merely serves to transmit motion from gear 38 to the take-up retort spool of drive pinion 36. Gear 38 is carried by a shaft 40$^x$ which also carries the upper feed roll 20. The lower feed roll 21 is carried by a shaft 42. Shaft 42 is driven through a gear 43 in mesh with gear 38, and gears 38 and 43 are of the same diameter and pitch.

Figure 13:
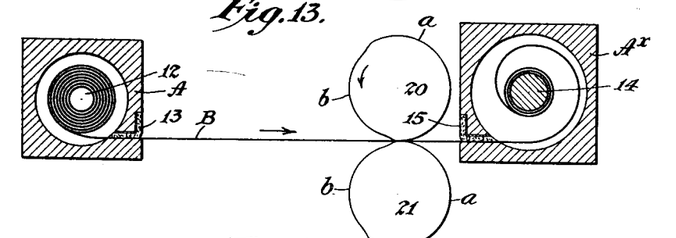
Figure 14:
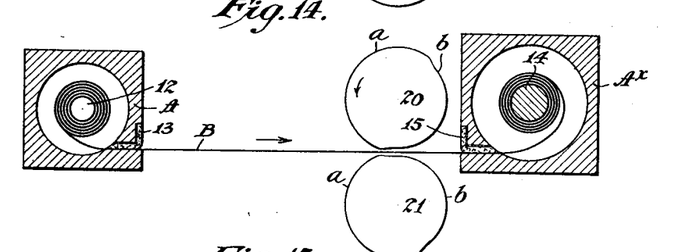

As indicated diagrammatically in Figs. 12 and 14, each of feed rolls 20 and 21 is provided with an active surface *a* and a cut-away inactive surface *b*. In the rotation of the feed rolls they will act to feed the strip toward the take-up retort so long as surface *a* is in contact with the strip, but when surface *a* passes the strip cut-away surfaces *b* permit a partial rotation of the rolls without action upon the strip, the strip thus remaining motionless during the opening of the shutter and exposure of that portion of the strip within the exposure field. However, the continued rotation of the gear wheels, while the strip remains motionless, causes a continued rotation of stud shaft 34 and hence a continued rotation of spool 14 of the take-up retort. The action is graphically shown in Figs. 12 to 14 inclusive. In Fig. 12 the feed rolls, retorts, spools and sensitized strip are shown in their respective positions at the beginning of a feeding movement of the strip. The feed rolls are shown at the instant of action upon the strip, feeding to the right and thus into the retort A*. In Fig. 13 the said elements are shown at the end of a feeding movement and preliminary to the strip remaining motionless for the exposure. It will be noted that the feed rolls push into the take-up a greater length of strip than has been taken up by spool 14, the slack being ready, however, for winding upon spool 14 during its continued rotation. In Fig. 14 the elements are shown at the end of an idle movement of the feed rolls. During such idle movement take-up spool 14 has wound in the greater portion of the slack. Such means permits a continuous rotation of the take-up spool, and hence a continuous take-up of exposed strip, and at the same time permitting intermittent action of the feed rolls and intermittent movement of that portion of the strip to the left of the take-up retort.

Figure 15:
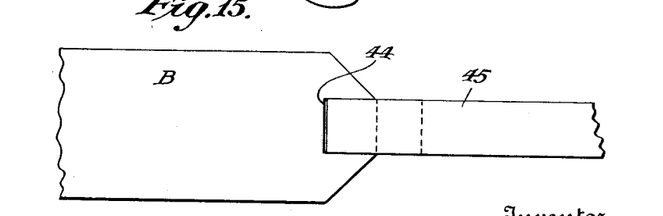
Figure 15 is a plan view of the front end of the sensitized strip, with non-sensitized extension for initial threading up of the film.

As shown in Fig. 15, that end of the sensitized strip B initially inserted in the take-up retort may have formed therein a slot 44 to receive a gummed tape 45 which may be wrapped around the spool and adhered thereto preliminary to the feeding action.

*The shutter actuating devices*

The shutter may be of any desired construction and actuation. In the present embodiment it is shown as comprising a shutter actuating rod 9 connected to one end of a lever 46, the latter being fulcrumed at 47 to a wall of the casing and being in engagement with a cam 48 on shaft 39*. The rear end of lever 46 is engaged by a spring 49 which serves to maintain the lever in contact with the cam. The cam 48 is synchronized with the feeding rolls so that when the active portions *a* of the rolls withdraw from the strip, and the latter remains motionless, the cam comes into action and lever 46 is rocked to impart successive opening and closing movements to the shutter by a single stroke of rod 9. In the continued rotation of the cam, its low point enables spring 49 to turn the shutter actuating lever to its initial position. Any suitable means may be employed for timing the shutter opening movement in accordance with the usual practice.

When the shutter is open, the image is, in the present embodiment, thrown upon a rectifying prism so that the exposed sensitized strip may be developed as a positive through chemical reversal of the shadows in a manner understood in the art, the sensitized strip paper being known as "positype" paper.

The prism 50 is a triangular prism secured in a holder 51, the latter being fastened to the casing by the screws 52 and having holding flanges 53. Holder 51 has at its centre a threaded aperture to receive a large headed screw 54 which overhangs the prism and secures it against displacement, the opposite face of the prism contacting with a stop member 55. In the said manner the prism is accurately positioned and held in such position. To cushion the prism and protect its rear face against scratches, said face may be covered with a strip of felt or other material as indicated at 56. The image is reflected at right angles by the prism and is reversed so that it appears on the strip, when developed, as would a print from a negative.

*Means for preventing reverse movement of the feed rolls*

Carried by shaft 39* is a wheel 57 having a serrated peripheral edge and carried by a stud screw 58 is a pawl 59 which is normally held in the position shown in Fig. 3 by means of a light spring 160*, one end of the spring engaging an abutment and the other end being connected to the pawl at a point above the stud screw 58. As long as gear wheel 39 rotates in the direction of the arrow, Fig. 3, pawl 59 is held in such position that its longitudinal axis is tangential to the axis of the wheel 57. When, however, a reverse movement is given to gear wheel 39 by a counter-clockwise movement of the operating handle 11, wheel 57 in its peripheral engagement with pawl 59, will move the latter to the left from its position shown in Fig. 3 so that its longitudinal axis will approach that of the wheel, and the pawl is so proportioned in length that it will promptly jam against the wheel and hold the latter against rotation, preventing continued movement of the operating handle.

*The counter*

Figure 4:
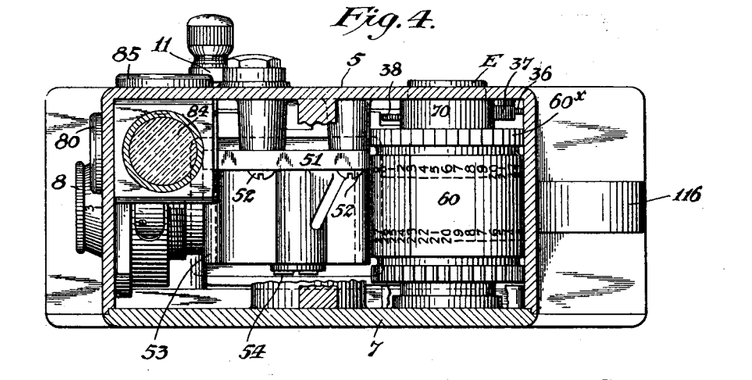
Figure 4 is a horizontal section on the line 4—4, Figure 3.
Figures 5, 6, 7:
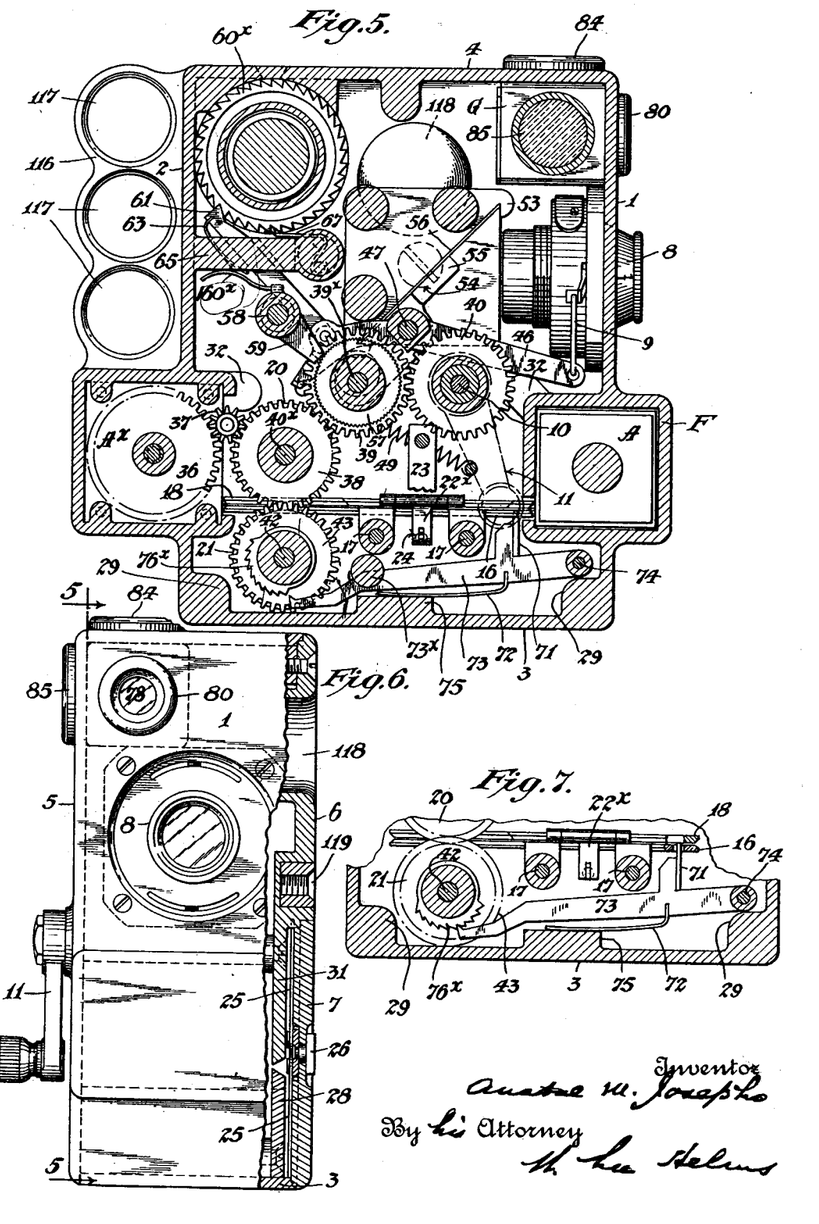
Figure 5 is a vertical section on the line 5—5, Figure 6.
Figure 6 is a front elevation partly broken away showing cover plate assembly.
Figure 7 is a detail section of film locking mechanism in locked position to keep end of film out from retort after all exposures are completed.

In register with two openings C, D in the top of the casing is a drum-like member 60, the general construction of which appears in Figs. 3, 4 and 5. The intermediate peripheral surface of the drum bears two columns of figures, in the present instance, the first column opposite aperture C indicating the unexposed sections of the strip and the figures opposite aperture D the exposed sections of the strip. The numbers are, of course, equivalent to the sections of the complete strip. If there are thirty-six sections to be exposed on the strip when the first picture has been exposed, the counter will show at aperture D the numeral 1 and at aperture C the numeral 35, etc. Drum 60 at one side of the numbered central portion is provided with a circumferential ratchet section 60ˣ, the teeth of which are engaged by a pawl 61, the lower end of the pawl being pivoted at 62 to a lug formed on lever 46. A spring 63 engaging the upper end of the pawl and also abutment wall 64 of abutment bar 65 serves to maintain the active end of the pawl in contact with the ratchet teeth. Thus in each active thrust of cam 48, pawl 61 is given an upward movement simultaneously with the action of lever 46 to operate the shutter. At the end of drum 60 opposite the said ratchet teeth is formed a circumferential line of shallow depressions 66 adapted to be successively engaged by a latch spring 67, the latter having its lower end bent around a pin 68 and thence sprung over a pin 69 in such manner that the upper end lies in spring engagement with a depression 66. It will be seen that the drum may be reset at any time by a movement reverse to that of its normal movement. To that end the hub 70 of the drum is formed with an outwardly projecting reduced section E which at a point exterior the wall 5 may be serrated for convenient engagement by the thumb or fingers of the operator so that the drum may conveniently be rotated.

*The feed roll positioning means*

Means are provided for insuring that when the feeding of a strip has been completed, the feed rolls shall be so positioned that they no longer grip the strip, enabling its ready removal with the take-up retort from the camera casing. The same means insures that when a fresh set of retorts and strip is ready for placement within the camera, the feed rolls will not obstruct the positioning of the strip. For this purpose there is provided a short distance exterior of the supply retort chamber F a strip contacting finger 71, which finger is adapted to project through a suitable passageway formed in the guide plate 16. When the strip is in position, finger 71 is depressed against the tension of a spring 72 carried by the finger holding arm 73. Arm 73 is pivoted at 74 upon casing wall 5 and the lower end of spring 72 engages an inwardly projecting boss 75, the boss having a further purpose of enabling adequate threaded aperture 76 for reception of the upper holding end of a tripod. Arm 73 at its end opposite pivotal point 74 is formed as a pawl and spring 72 acts to move the pawl end of the arm in engagement with the segmental ratchet 76ˣ carried upon the shaft 42 on which the lower feed roll 21 is mounted. Cast on wall 5 is a projecting lug 73ˣ, which lug acts as a contacting and guide member for a face of pawl arm 73, guiding the arm in proper position relatively to the segmental ratchet 76ˣ.

The strip in its movement from the supply retort to the take-up retort so depresses finger 71 that arm 73 is held in the position shown in Fig. 3, and the pawl end of the arm is held out of engagement with segmental ratchet 76ˣ. When, however, the strip is entirely withdrawn from the supply retort and passes beyond finger 71, the latter is free to rise and spring 72 acts upon arm 73 moving the arm and finger upwardly and causing the pawl end of the arm to engage segmental ratchet 76ˣ immediately if the latter is opposite the pawl, or in a partial rotation of shaft 42 if the segmental ratchet should be in an upper position. In either case, shaft 42, the feed rolls, the operating handle and all other movable parts will be locked in position prior to the movement of the end of the strip past the exposure field, the arrangement being such that the section at the end of the strip may be exposed, with a locking of the feed rolls immediately subsequent to such exposure.

*The double acting finder*

Figure 16:
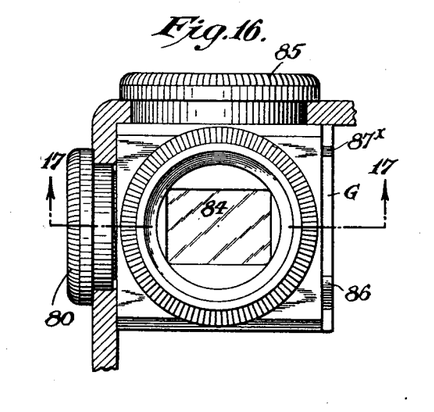
Figure 16 is a plan view of the finder with adjacent parts of the camera casing in section.
Figure 17:
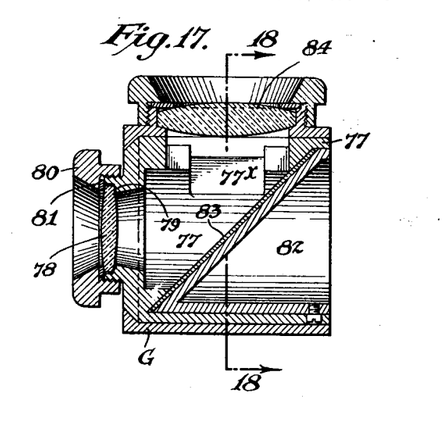
Figure 17 is a vertical section on the line 17—17, Figure 16.
Figure 18:
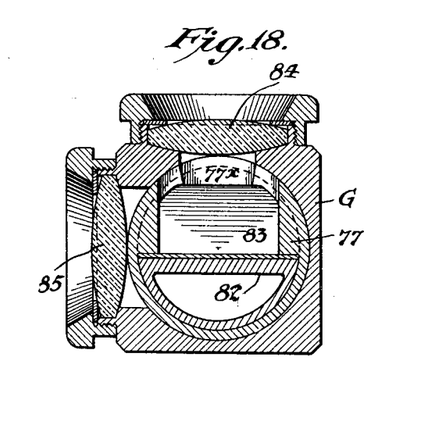
Figure 18 is a section on the line 18—18, Figure 17.
Figure 19:
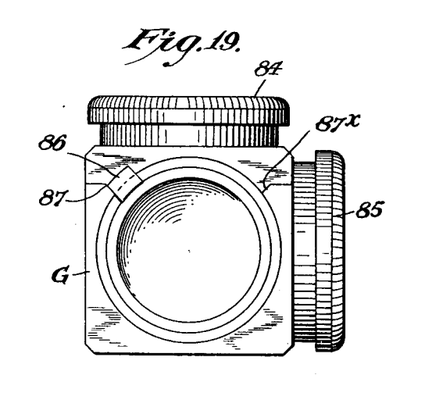
Figure 19 is a rear elevation of the finder showing a stop to limit rotation of the finder barrel.
Figure 20:
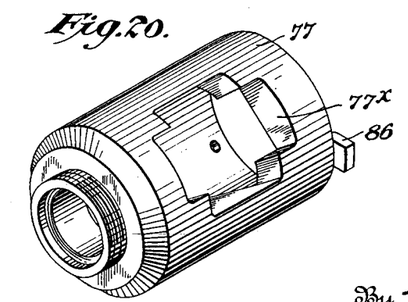
Figure 20 is a perspective view of the finder barrel.
Figure 21:
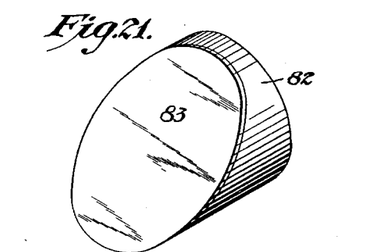
Figure 21 is a perspective view of the finder barrel reflector.
Figure 22:
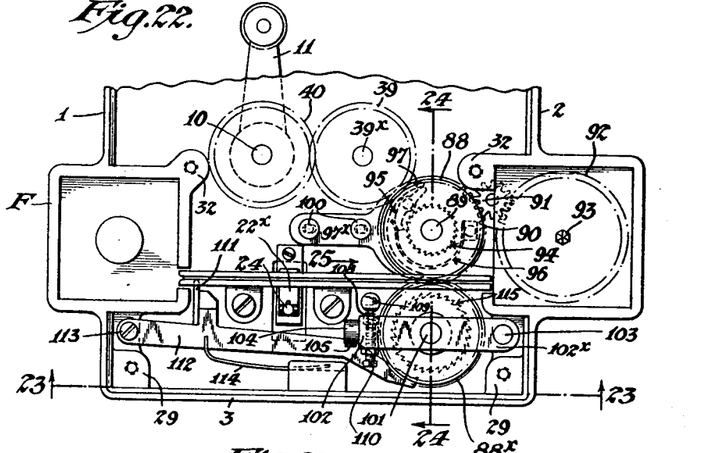
Figure 22 is a detail view similar to Figure 3 showing a modified form of film feed mechanism.
Figure 23:
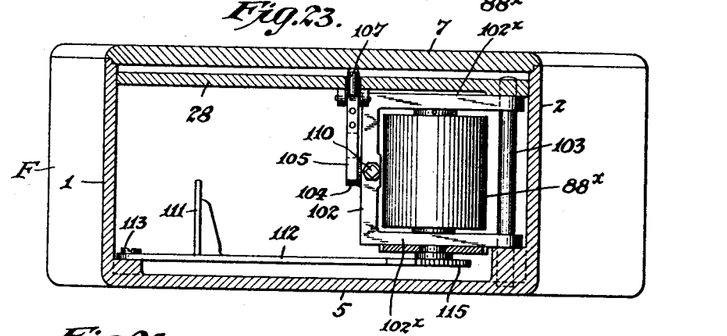
Figure 23 is a section on the line 23—23, Figure 22.
Figure 24:
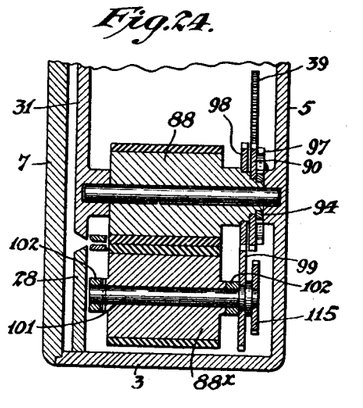
Figure 24 is a section on the line 24—24, Figure 22.
Figure 25:
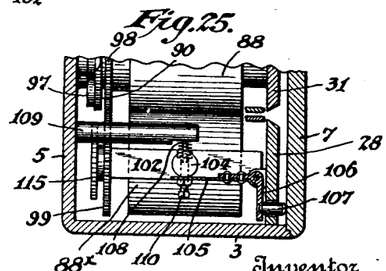
Figure 25 is an irregular section through Figure 22 as indicated by the arrow 25.

The double acting finder comprises a casing G having an annular chamber adapted to receive a rotatable barrel-like member 77 adapted to support the primary finder lens 78 and for this purpose having a shoulder 79 against which the lens rests, a screw cap 80 holding the lens in position against the shoulder through the intermediary of a washer 81. Carried by rotatable barrel 77 is a wedge-like support 82 for a reflecting mirror 83. The image passing through primary finder lens 78 is received by mirror 83 and thrown at right angles thereto. In the position of the finder elements shown in Figs. 16 and 17, the image is thrown by the mirror through a secondary finder lens 84 at the top of the camera casing, the camera being held vertically. When the camera is held horizontally, however, cap 80 may be grasped by the fingers and turned so as to rotate barrel 77 a quarter turn, for example, so as to position the mirror 83 in order to throw the image through a lens located at a side wall of the camera, this lens being indicated by the numeral 85, Fig. 18. To prevent rotation of the barrel more than a quarter turn, there is carried thereby a projecting stop member 86 which is adapted to contact with opposed stops 87 and 87ˣ on casing G, as shown in Fig. 19. In either position of the barrel the image passes through a central opening 77ˣ therein and thence to the appropriate secondary finder lens. By such means the duplication of finder elements is avoided, a single finder being provided for both vertical and horizontal positions of the camera, the saving being of one primary finder lens, one reflecting mirror and the mountings for the two. A saving in space also results.

*The modified feeding means*

If it is desired to provide feeding means for continuously engaging the strip, such means being intermittently actuated in conjunction with the continuous rotation of the spool with the take-up retort, means such as illustrated in Figs. 22 to 25 inclusive may be provided. In the said figures the operating handle is connected, as heretofore described, with a shaft 10, which shaft carries a gear 40 in mesh with a second gear 39 on a shaft 39˟. From this point the elements are modifications of those heretofore described. The upper feeding roll 88 is carried on a shaft 89, which shaft loosely carries a gear 90 in mesh with gear 39. Gear 90 drives a pinion 91 in mesh with a gear 92 carrying stud shaft 93 for the spool of the take-up retort. Inasmuch as gear 90 is loosely mounted on shaft 89, it does not directly rotate said shaft. However, shaft 89 has fixed thereto a ratchet wheel 94 and gear wheel 90 carries a pawl 95 adapted to intermittently engage the ratchet wheel. A spring 96 acts upon pawl 95 with the tendency to move the same into engagement with the ratchet wheel 94, and thus cause the engagement of the pawl with the ratchet wheel for a partial rotation of gear 90. However, at the end of such rotation the rear end of the pawl engages a segmental cam 97, and said cam holds the pawl out of engagement with the ratchet wheel for a predetermined period, during which period the exposure is effected, the period of retraction of the pawl being sufficiently adequate for the maximum time exposure which might be required. Upper feed roll 88 is operatively connected to lower feed roll 88˟ through the intermeshing of two gears, the first gear 98 being carried by the upper feed roll and the second gear 99 by the lower feed roll.

Segmental cam 97 is carried by an adjustable arm 97˟. Set screws 100 pass through elongated slots formed in arm 97˟ and by loosening the set screws the arm may be moved toward and from shaft 89 for adjusting the length of throw of the pawl.

Means are provided for retracting the lower roll from the upper roll for the convenient insertion of a fresh strip with its connected retorts. For this purpose shaft 101 is journalled in suitable apertures formed in the arms 102˟ of a bracket 102, the bracket being pivoted on a shaft 103. Bracket 102 is formed with a boss 104 engaged by a flat spring 105. Flat spring 105 is carried by an elbow lever 106, having at one end a contact stud 107 adapted to be engaged by removable cover plate 7. When cover plate 7 is in position it presses upon stud 107 and, through flat spring 105, serves to maintain the shaft of lower feed roll 88˟ in such position that the two rolls are in an operative firm grip with the sensitized strip. When the cover plate 7 is removed, its pressure upon stud 107 is released and a light coiled spring 108 serves to retract the lower feed roll to enable ready removal of the exposed strip and insertion of a fresh strip and retorts. The upper end of spring 108 engages a contact member 109 and the lower end engages boss 104, the spring being guided by any suitable means such as a pin. In the embodiment shown, spring 108 lies within a vertical aperture formed in boss 104, which aperture is threaded to receive an adjusting screw 110 by means of which the tension of the spring may be increased or decreased.

Means are provided for locking the operating handle and the means driven thereby for further actuation when the end of the strip passes from the supply retort and the exposures are completed. To this end a finger 111 is pressed to contact with the sensitized strip until the strip passes beyond the range of the finger. The finger is carried by pawl arm 112 pivoted at 113. When the strip passes the finger, a spring 114 moves the pawl end of arm 112 into engagement with a ratchet wheel 115 carried by shaft 101 and thereupon the shaft and all movable parts connected therewith are locked. The operator will immediately be informed that the last exposure has been taken and the camera is ready for a refill. A further purpose of the locking means is to prevent the end of the sensitized strip from being pulled into the take-up retort when a projecting end is desired for any purpose, such as for clamping in a developing apparatus.

In the present embodiment the casing is formed on its rear vertical wall with a bracket 116 which may be cast integral with the casing or secured thereto in any suitable manner. The bracket is formed with the finger holes 117 so that the camera may be conveniently carried. In the wall of the camera opposite handle 11 is a thumb depression 118, the arrangement being such that the thumb of the left hand may steady and assist in supporting the camera while the fingers afford the main support at the base wall of the camera, leaving the right hand free to operate handle 11. A threaded recess 119 may be provided in wall 6 for receiving a tripod to support the camera horizontally.

It is also to be noted that a flat spring 120 may be employed to engage the edge of the strip at the outlet end of retort A. This spring may be supported by a cover plate 7.

It will be understood that various modifications may be made in the form and arrangement of the elements comprising the embodiment illustrated in the drawings, without departing from the spirit of the invention, what I claim and desire to secure by Letters Patent being as follows:—

1. In photographic cameras comprising a casing, a lens, a shutter and shutter-operating means, the casing having therein a supply retort chamber and a take-up retort chamber, of a revolvable member in one of said retort chambers adapted to rotate a spool within an appropriate retort, in combination with intermittent feeding means for a sensitized strip, a supply retort, within which the major portion of the strip is contained, a take-up retort in which a minor portion of the strip is initially received, the retorts being so adapted that they may be moved in opposite directions to provide a section of the strip intermediate the retorts for actuation by the feeding mechanism of the camera, whereby said feeding mechanism may advance the strip from the supply retort to the take-up retort.

2. In photographic cameras comprising a casing, a lens, a shutter and shutter-operating means, the casing having therein a supply retort chamber and a take-up retort chamber, of a revolvable member in one of said retort chambers adapted to rotate a spool within an appropriate retort, holding means for a sensitized strip comprising a light-tight supply retort, within which the major portion of the strip is initially contained, a light-tight take-up retort in which a minor portion of the strip is initially received, the retorts being so adapted that they may be initially held in juxtaposition and be moved in opposite directions to provide a section of strip intermediate the retorts to lie within the exposure field of the camera.

3. In photographic cameras comprising a casing, a lens, a shutter and shutter-operating means, the casing having therein a supply retort chamber and a take-up retort chamber, of a revolvable member in one of said retort chambers adapted to rotate a spool within an appropriate retort, holding means for a sensitized strip comprising a light-tight supply retort, a sensitized strip having its major portion contained within said supply retort, a light-tight take-up retort adjacent the supply retort and connected to the strip, the retorts being so adapted that they may be moved away from each other to withdraw a section of strip from the supply retort to lie within the exposure field of the camera.

4. In photographic cameras comprising a casing, a lens, a shutter and shutter-operating means, the casing having therein a supply retort chamber and a take-up retort chamber, of a revolvable member in one of said retort chambers adapted to rotate a spool within an appropriate retort, holding means for a sensitized strip comprising supply retort means for holding the retort against rotation, a sensitized strip, the major portion of which is initially contained within said retort, a take-up retort and means for holding the same against rotation, a spool within the take-up retort and connected to an end of the strip, the spool being adapted for connection with a driving device and a camera casing having an exposure field intermediate said retorts.

5. In photographic cameras comprising a casing, a lens, a shutter and shutter-operating means, the casing having therein a supply retort chamber and a take-up retort chamber, of a revolvable member in one of said retort chambers adapted to rotate a spool within an appropriate retort, a take-up retort comprising a light-tight casing, and a spool rotatably mounted in said casing, the casing being apertured concentric with the spool and the spool being adapted for connection with means for rotating it from a point exterior of the casing, the retort being adapted for insertion within an appropriate retort chamber of the camera.

6. In photographic cameras, means for holding and feeding a sensitized strip comprising opposed retort receiving chambers, feeding rolls intermediate said chambers, a cover plate removable from the camera for exposing the retort chambers, strip guiding means for intermediate the retort receiving chambers, means for spreading said guiding means and means controlled by the cover for actuating said spreading means.

7. A take-up retort constructed in accordance with claim 5 in which the retort casing is provided at a point opposite said concentric aperture with an exterior thumb piece.

8. In photographic cameras, holding and feeding means for a sensitized strip comprising opposed chambers having rectangular walls, one being adapted to receive a supply retort and the second a take-up retort, a spindle in the second chamber, opposed feeding rolls intermediate the chambers, a drive shaft, gearing within the casing and connected to said drive shaft and to the feeding rolls and spindle, and means for locking said gearing, said means being held inactive by the strip in its passage between the two chambers, and being released into action subsequent to the withdrawal of the strip from the first of said chambers.

9. In photographic cameras, holding and feeding means for a sensitized strip comprising a casing, means for feeding a sensitized strip across an exposure field, including feed rolls, a shaft and an operating handle therefor, the shaft being operatively connected with the feeding means, a finger adapted to contact with the strip in its passage to the feeding means, a pawl connected with said finger, and a spring tending to move the pawl in position to lock the feeding means when the strip passes beyond the range of the finger and permits movement of the latter.

10. In photographic cameras, holding and feeding means for a sensitized strip comprising a casing, an operating shaft for rotating said shaft exteriorly of the casing, feeding rolls, gearing connecting said shaft and the feeding rolls, a spindle for driving a take-up spool for a sensitized strip, means for rotating said spindle, a rachet rotatable with one of said feeding rolls, a pawl lever, a spring tending to move said lever into position to engage the ratchet, and a finger carried by the pawl lever, said finger being adapted for engagement with the sensitized strip in its passage to the feed rolls whereby the pawl lever is held out of operative position.

11. In photographic cameras, feeding means for a sensitized strip, comprising a casing, feeding means within the casing for intermittently advancing a sensitized strip, a drive shaft, an operating handle exterior of the casing for rotating the drive shaft, gearing intermediate the drive shaft and the feeding means, and means for holding said gearing against rotation except in a single direction, said means comprising an annular ratchet member, a pawl-like member in engagement with the ratchet member, a spring tending to hold said pawl-like member substantially tangential to the axis of the ratchet member, the pawl-like member being of such length that upon rotation of the ratchet member in a given direction the pawl-like member is so moved that its longitudinal axis approaches that of the ratchet member, as and for the purpose set forth.

12. In photographic cameras, a casing, a lens supported by the casing, means within the casing for supporting a sensitized strip in the plane of the lens axis, a chamber adapted to receive a supply retort for the sensitized strip, a second chamber adapted to receive a take-up retort for the strip, feeding means intermediate the chambers and adapted to advance the sensitized strip step by step, and a prism having a face parallel with the plane of the lens and a face parallel with the axis of the lens, substantially as shown and described.

13. In photographic cameras, a casing, a lens, opposed chambers in said casing, one chamber being adapted to support a supply retort and the second chamber being adapted to supply a take-up retort, for a sensitized strip, feeding rolls intermediate the chambers, strip guiding means intermediate the chambers and adapted to guide the strip parallel with the axis of the lens, a prism rearwardly of the lens and having one face parallel with the lens and a second face parallel with the strip guiding means, means for actuating the strip feeding means from a point exteriorly of the camera, and means connected with said strip feeding means for rotating a spindle in said second chamber.

14. In photographic cameras, a casing, a lens, opposed sensitized strip receiving chambers, a strip feeding means intermediate the chambers, a power shaft having connections with said strip feeding means and operable from a point exterior of the casing, and strip guiding means comprising opposed plates, a section of one plate being movable, a spring device for moving said plate, a cover for a wall of the casing and means intermediate the cover and said spring device for controlling the same.

15. In photographic cameras, a casing, a lens, supporting means for a sensitized strip, feeding means for intermittently gripping and advancing the strip from one point to another within the casing, and pawl and ratchet means controlled by the strip whereby the passage of the latter to a predetermined position acts upon the rolls to hold them in position out of gripping relationship with the strip.

In testimony whereof I have signed my name to this specification.

ANATOL M. JOSEPHO.